Patented Sept. 30, 1924.

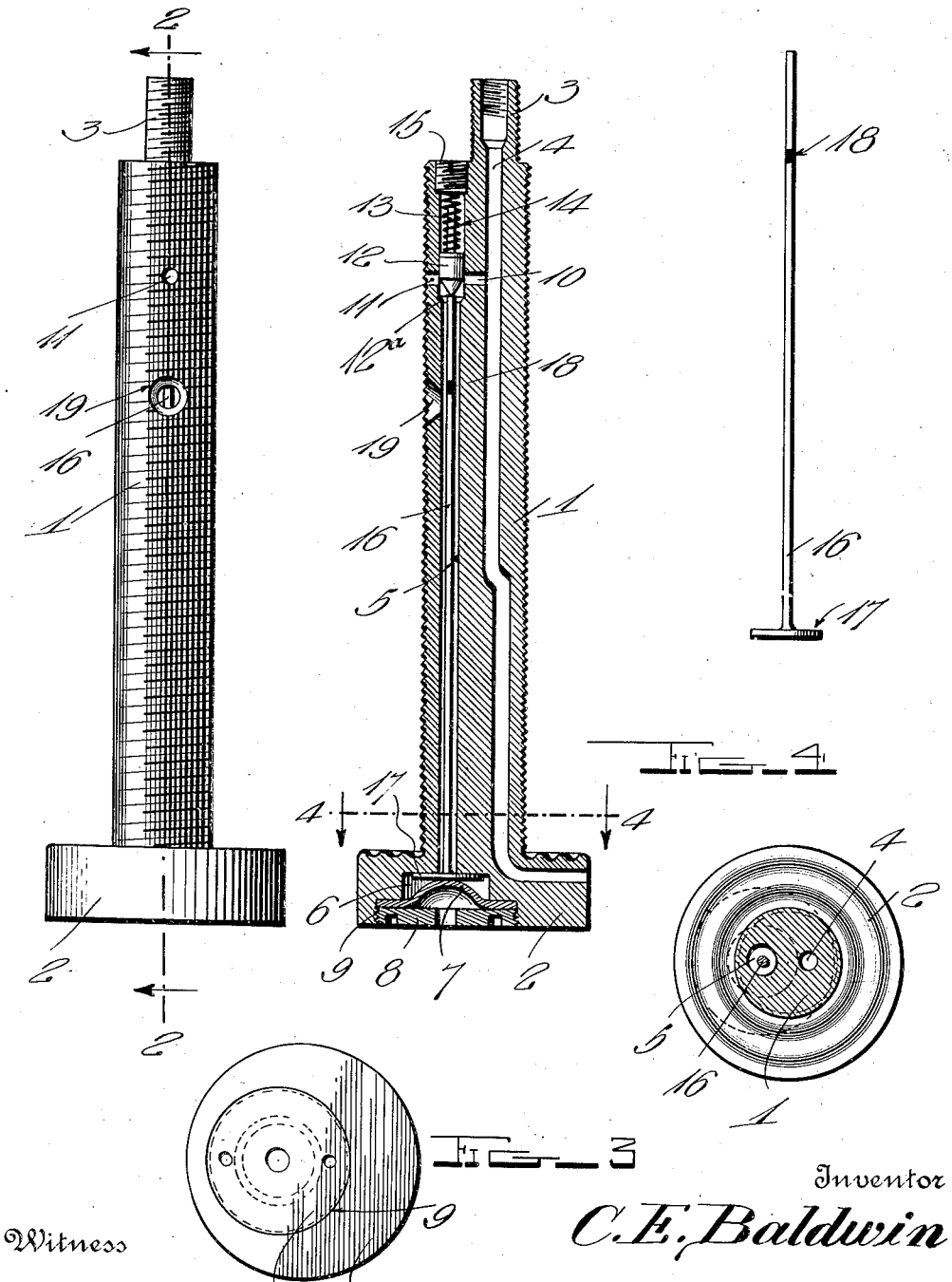

1,510,029

UNITED STATES PATENT OFFICE.

CHARLES EDWIN BALDWIN, OF OCONTO, WISCONSIN, ASSIGNOR OF ONE-FOURTH TO PHILIP ABRAM BADOUR, OF OCONTO, WISCONSIN.

TIRE-VALVE STEM.

Application filed August 20, 1923. Serial No. 658,403.

*To all whom it may concern:*

Be it known, that I, CHARLES EDWIN BALDWIN, a citizen of the United States, residing at Oconto, in the county of Oconto and State of Wisconsin, have invented certain new and useful Improvements in Tire-Valve Stems; and I do declare the following to be a full, clear, and exact description of the invention, such as will enable others skilled in the art to which it appertains to make and use the same.

My invention has for its object to provide an extremely simple and compact tire inflation stem which embodies also a safety blow-off valve for excess pressure and an indicator operable to show when the proper pressure has been forced into the tire, as well as indicating when the tire is underinflated.

With the foregoing in view, the invention resides in the novel subject matter hereinafter described and claimed, the description being supplemented by the accompanying drawing:

Figure 1 is a side elevation of a stem embodying my invention.

Fig. 2 is a longitudinal sectional view as indicated by line 2—2 of Fig. 1.

Fig. 3 is an inner end elevation.

Fig. 4 is a transverse sectional view on line 4—4 of Fig. 1.

Fig. 5 is a side elevation of the pressure controlled rod for opening the blow off valve and indicating the pressure within the tire.

In the drawings above briefly described, the numeral 1 designates a straight elongated cylindrical stem having an enlarged inner end 2 adapted to be clamped against the inner side of a tire tube by the usual nut (not shown). The outer end of the stem 1 is provided with a threaded nipple 3 and from this nipple, an inflation bore 4 leads through one side portion of the stem and discharges laterally through its enlarged end 2. The usual Schraeder valve is receivable in the bore 4 and the nipple 3 is of a size to accommodate the valve cap now commonly used. Both this nipple and the bore 4 are positioned off-center to permit the formation of a second longitudinal bore 5 through the stem, the inner end of this bore being in communication with a recess 6 formed in the enlarged stem end 2. A diaphragm 7 of rubber or other desired material extends across this recess and may be secured in place by any suitable means such as the threaded ring 8 received in the counter-bored outer end 9 of the recess.

The inflation bore 4 is in communication with the bore 5 by means of a suitable pressure escape port 10 near the outer end of the stem 1 and a second pressure escape port 11 leads from said bore 5. The port 10 is normally closed by a slidable valve 12 positioned in the outer end of the bore 5, the active part of said valve being preferably formed of rubber, said part being preferably provided with a metal stem 13 extending outwardly in the bore 5 and surrounded by a valve seating spring 14. The outer end of this spring, in the construction shown, bears against a plug 15 threaded in the bore. The outer end of the bore 5 is preferably enlarged so as to provide a shoulder $12^a$ to prevent the valve 12 from sliding inwardly beyond the ports 10 and 11.

A valve opening and pressure indicating rod 16 is loosely received in the bore 5 between the valve 12 and the diaphragm 7, the inner end of said rod being preferably provided with a disk-like head 17 contacting with the diaphragm and preventing mutilation of the latter. When the pressure in the tire rises above a predetermined extent, the diaphragm 7 moves the rod 16 to open the valve 12 which allows the air to escape through the ports 10 and 11 instead of passing through the bore 4 and entering the tire.

In order that it may be readily seen when the pressure is normal within the tire or when the latter is underinflated, I prefer to provide the stem 16 with some suitable visible indicator 18 which may well be painted thereon to be visible through an opening 19 in the stem when the proper pressure exists. If this indicator is not visible, or appears at the lower extremity of the opening 19, warning is given that the tire is underinflated.

When inflating a tire with the improved valve stem, there is no danger of overinflation, as the diaphragm 7 moves the rod 16 to open the valve 12 as soon as the predetermined pressure within the tire is reached and hence excess pressure will blow off, giving warning that the tire is inflated to the number of pounds pressure predetermined by the resistance of the spring 14. Attention is further directed to the fact that when a tire equipped with the invention, overheats and the contained air consequently expands and increases its pressure, such pressure will operate the diaphragm 7 to move the rod 16 and unseat the valve 12, permitting the excess pressure to escape through the ports 10 and 11. This is particularly advantageous upon motorcycles or automobiles used in races.

As excellent results are obtainable from the details disclosed, these details are preferably followed, but within the scope of the invention as claimed, numerous minor changes may be made.

I claim:—

1. A tire inflation stem having an enlarged inner end, a longitudinal inflation bore opening laterally through said enlarged end, an off-center recess in said enlarged end, a second longitudinal bore leading from said recess, a pressure escape port from said inflation bore into said second bore, and a second pressure escape port from said second bore; a slidable spring-seated valve in said second bore for closing said first named port, a releasing rod in said second bore for unseating said valve, and a diaphragm secured in said recess for operating said rod.

2. A structure as specified in claim 1; said rod having an indicator visible through an opening in the stem for indicating predetermined pressure in the tire.

In testimony whereof I have hereunto affixed my signature.

CHARLES EDWIN BALDWIN.